(12) United States Patent
Jayasuriya et al.

(10) Patent No.: US 10,220,747 B2
(45) Date of Patent: *Mar. 5, 2019

(54) FULLY COLLAPSING ARMREST INSERT WITH TUNABLE TENSIONING ELEMENTS

(71) Applicant: Ford Global Technologies, LLC, Dearborn, MI (US)

(72) Inventors: Mangala A. Jayasuriya, Bloomfield Hills, MI (US); Robert William McCoy, Ann Arbor, MI (US); Kenneth S. Laird, Canton, MI (US); Linh Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/407,627

(22) Filed: Jan. 17, 2017

(65) Prior Publication Data

US 2017/0120785 A1 May 4, 2017

Related U.S. Application Data

(63) Continuation of application No. 14/261,723, filed on Apr. 25, 2014, now Pat. No. 9,610,873.

(51) Int. Cl.
*A47C 7/68* (2006.01)
*B60R 21/04* (2006.01)
*B60N 2/75* (2018.01)
*B60N 2/427* (2006.01)
*A47C 7/54* (2006.01)

(52) U.S. Cl.
CPC ........... *B60N 2/78* (2018.02); *B60N 2/42709* (2013.01); *B60N 2/753* (2018.02); *A47C 7/54* (2013.01); *A47C 7/68* (2013.01)

(58) Field of Classification Search
CPC .. A47C 7/68; A47C 7/54; B60N 2/427; B60N 2/42709; B60N 2/46; B60N 2/4606; B60N 2/4646; B60N 2/4653
See application file for complete search history.

(56) References Cited

U.S. PATENT DOCUMENTS

| | | | |
|---|---|---|---|
| 3,362,749 A | 1/1968 | Clement | |
| 3,387,881 A | 6/1968 | Stepanek et al. | |
| 4,783,114 A | 11/1988 | Welch | |
| 5,181,759 A | 1/1993 | Doolittle | |
| 5,464,272 A | 11/1995 | Spykerman | |
| 5,527,084 A | 6/1996 | Scherf | |
| 5,803,415 A | 9/1998 | Konishi et al. | |

(Continued)

OTHER PUBLICATIONS

String Instrument (Year: 2008).*

*Primary Examiner* — Phi D A
(74) *Attorney, Agent, or Firm* — Vichit Chea; Price Heneveld LLP (57) ABSTRACT

A collapsible vehicular armrest substrate includes load-bearing strips extending across a gap defined within a support frame. A first tunable element secures the load-bearing strips in a support position on the support frame. A first tension-adjusting portion sets a predetermined first tension limit of the first tunable element. The load-bearing strips disengage from the support position when the first tunable element experiences an actual tension greater than the predetermined first tension limit.

18 Claims, 7 Drawing Sheets

(56) References Cited

U.S. PATENT DOCUMENTS

| | | | |
|---|---|---|---|
| 6,142,563 A | 11/2000 | Townsend | |
| 6,454,305 B1 | 9/2002 | Prottengeier | |
| 6,666,506 B2 * | 12/2003 | Burns | B60N 3/101 |
| | | | 297/188.14 |
| 6,893,077 B1 | 5/2005 | DeJongh | |
| 7,070,221 B2 | 7/2006 | Cowelchuk et al. | |
| 7,121,611 B2 | 10/2006 | Hirotani et al. | |
| 7,387,326 B2 | 6/2008 | Osada | |
| 7,503,621 B2 | 3/2009 | Mani | |
| 7,681,939 B2 | 3/2010 | Augustyn | |
| 7,726,726 B2 | 6/2010 | Cavallin et al. | |
| 7,731,268 B2 | 6/2010 | Motowski et al. | |
| 7,794,009 B2 | 9/2010 | Pinkerton et al. | |
| 7,794,010 B2 | 9/2010 | Saida et al. | |
| 7,828,388 B2 | 11/2010 | Thomas | |
| 7,871,119 B2 | 1/2011 | Schoemann et al. | |
| 8,157,309 B2 | 4/2012 | Ishikawa | |
| 8,172,311 B2 | 5/2012 | Hughes, Jr. et al. | |
| 8,424,954 B2 | 4/2013 | Hall et al. | |
| 8,454,071 B2 | 6/2013 | Stoia | |
| 8,740,287 B2 | 6/2014 | Onda | |
| 2002/0079684 A1 | 6/2002 | Prottengeier | |
| 2002/0158486 A1 | 10/2002 | Dauvergne | |
| 2005/0181178 A1 * | 8/2005 | Murayama | B60R 21/04 |
| | | | 428/167 |
| 2007/0262612 A1 | 11/2007 | Cowelchuk | |
| 2009/0167055 A1 | 7/2009 | Niezur | |
| 2010/0127551 A1 | 5/2010 | Heidmann | |
| 2013/0062899 A1 * | 3/2013 | Stoia | B60N 2/773 |
| | | | 296/24.34 |
| 2013/0278028 A1 * | 10/2013 | Gaeng | B60N 2/42709 |
| | | | 297/216.12 |
| 2014/0091609 A1 * | 4/2014 | Van Der Jagt | A47C 17/02 |
| | | | 297/411.2 |
| 2014/0210232 A1 | 7/2014 | Platzek | |
| 2015/0115585 A1 | 4/2015 | Smith | |
| 2015/0158448 A1 | 6/2015 | Sundarajan | |
| 2015/0283926 A1 | 10/2015 | Hamdoon | |

\* cited by examiner

FULLY COLLAPSING ARMREST INSERT WITH TUNABLE TENSIONING ELEMENTS

CROSS-REFERENCE TO RELATED APPLICATION

The present application is a continuation of U.S. patent application Ser. No. 14/261,723 filed Apr. 25, 2014, entitled FULLY COLLAPSING ARMREST INSERT WITH TUNABLE TENSIONING ELEMENTS, the entire disclosure of which is hereby incorporated herein by reference.

FIELD OF THE INVENTION

The present invention generally relates to vehicle armrests, and more specifically, a vehicle armrest having load-carrying strips and a tunable tensioning element that selectively positions the carrying strips.

BACKGROUND OF THE INVENTION

Vehicles contain various styles of armrests within door assemblies and also within side panels adjacent vehicle seating, where no door is present. Various armrests can include additional cushioning of handles, as well as other features such as storage compartments and cup holders. Because armrests project into the cabin space of the vehicle, they can present potential hazards during a side impact collision placed upon the vehicle. In such an impact, the armrest can be forced further into the cabin area as a result of the impact.

SUMMARY OF THE INVENTION

According to one aspect of the present invention, a collapsible vehicular armrest substrate includes load-bearing strips extending across a gap defined within a support frame. A first tunable element secures the load-bearing strips in a support position on the support frame. A first tension-adjusting portion sets a predetermined first tension limit of the first tunable element. The load-bearing strips disengage from the support position when the first tunable element experiences an actual tension greater than the predetermined first tension limit.

According to another aspect of the present invention, a collapsible vehicular armrest substrate includes a collapsible grid. At least one tunable element secures the collapsible grid to a perimetrical frame in a support position. A tension-adjusting portion sets a predetermined tension limit of each at least one tunable element. The collapsible grid disengages from the support position when the at least one tunable element experiences an actual tension greater than the predetermined tension limit.

According to another aspect of the present invention, a collapsible vehicular armrest substrate includes collapsible load-bearing strips, at least one tunable element securing the collapsible load-bearing strips to a perimetrical frame in a support position and a tension-adjusting portion that sets a predetermined tension limit of each at least one tunable element. The collapsible load-bearing strips disengage from the support position and move toward a collapsed position when the at least one tunable element experiences an actual tension greater than the predetermined tension limit.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
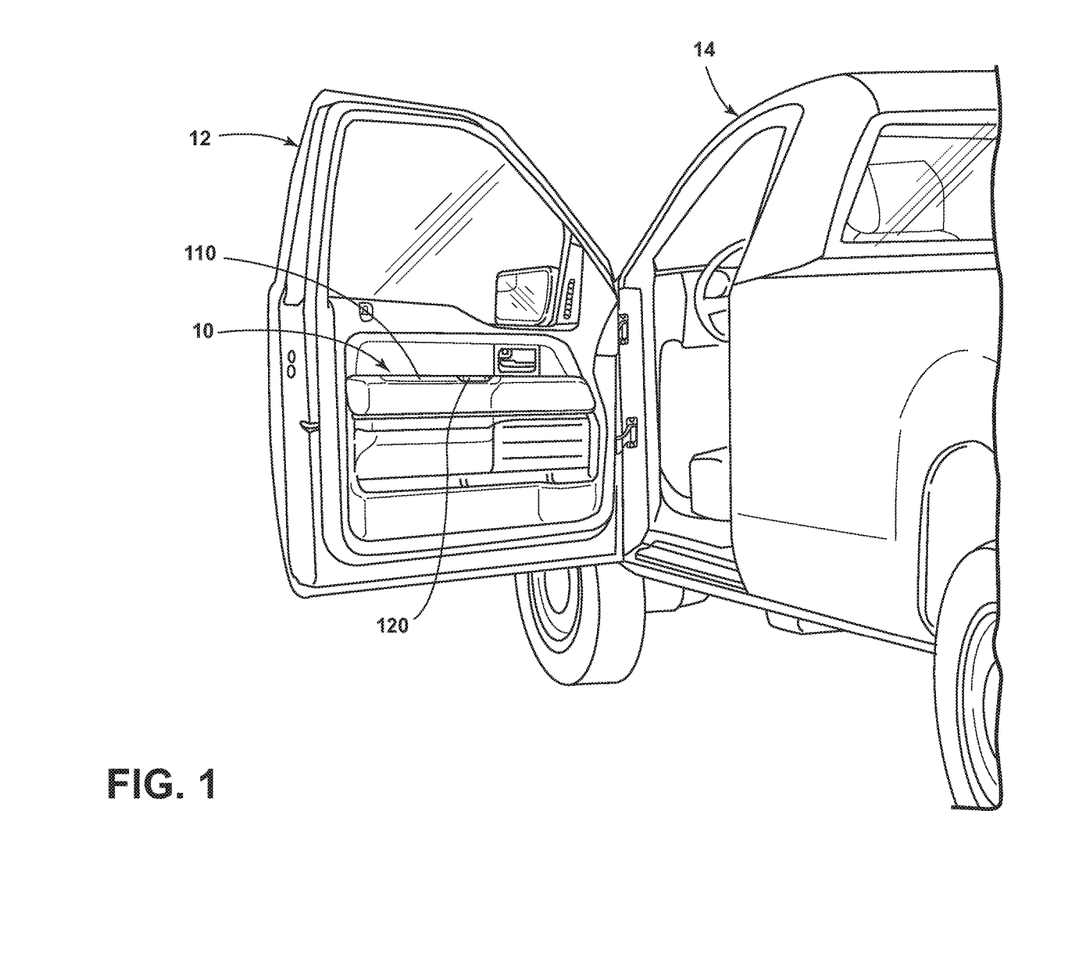
FIG. 1 is a rear side perspective view of a vehicle with a door in the open position and with an embodiment of the tunable armrest substrate installed.
Figure 2:
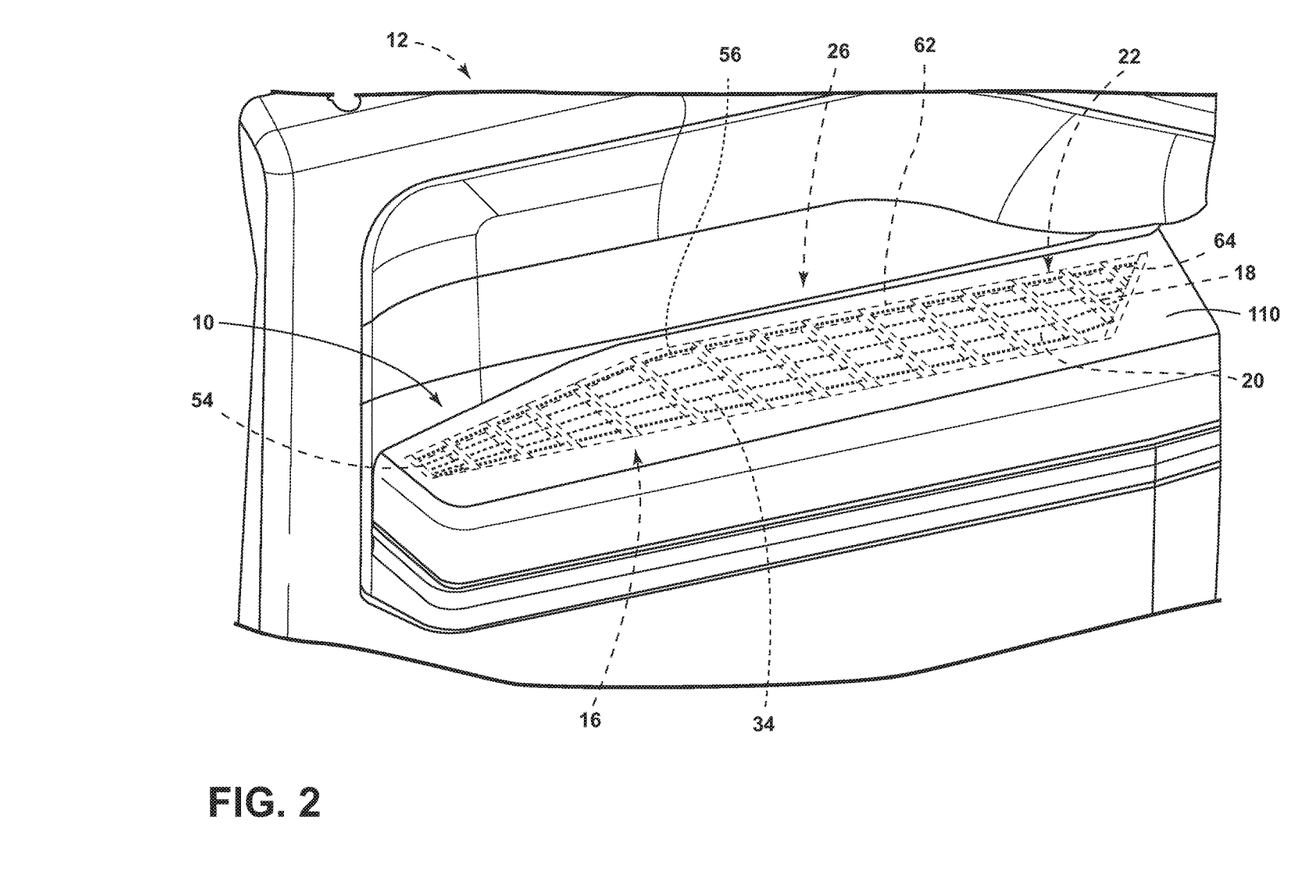
FIG. 2 is a top perspective view of the armrest of FIG. 1 with the tunable substrate installed.
Figure 3:
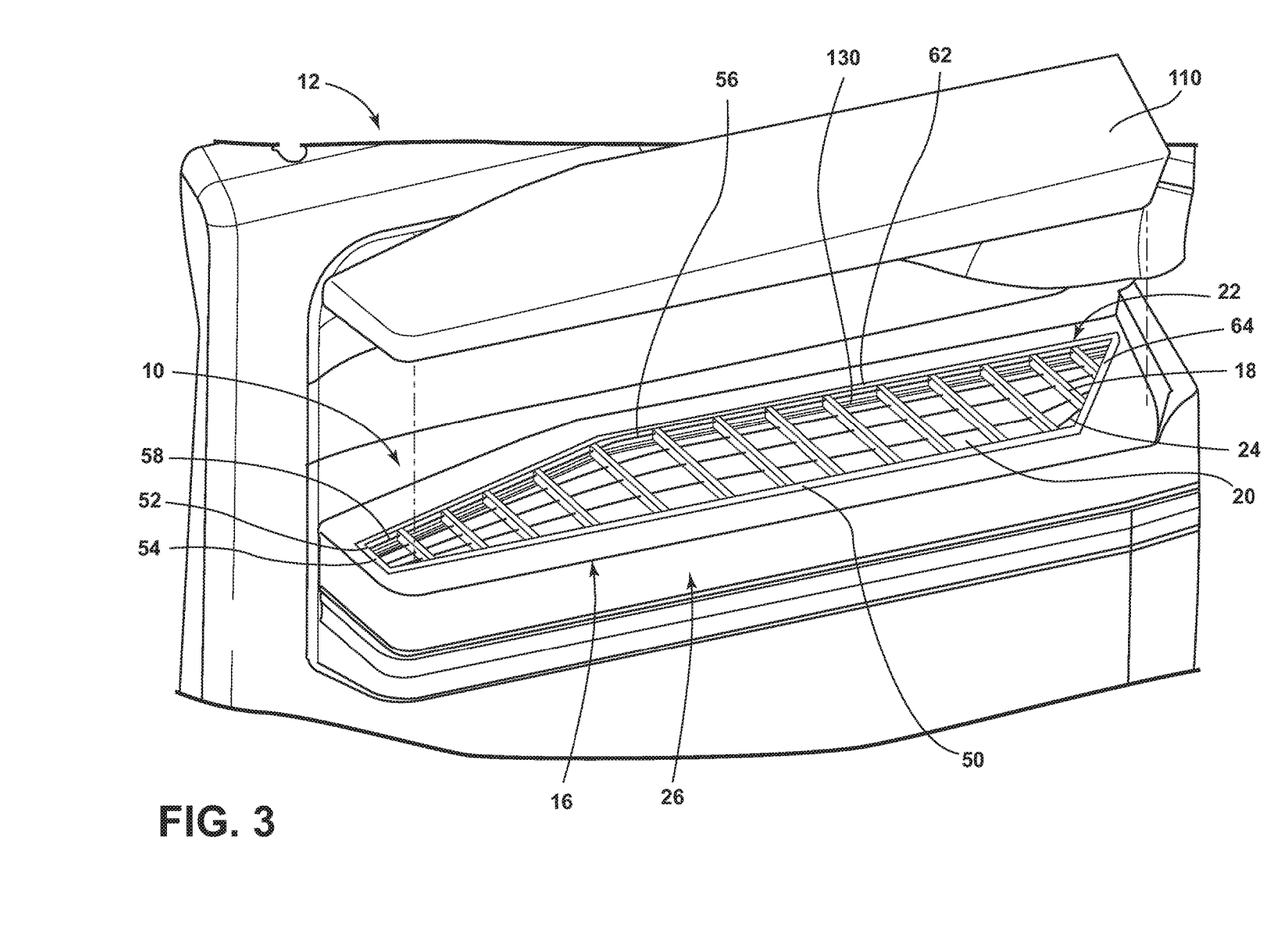
FIG. 3 is a partially exploded view of the vehicle armrest of FIG. 2 with the cushion removed to reveal the tunable armrest substrate.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-6, reference numeral 10 generally refers to a vehicle armrest 10 for the vehicle door 12 of a vehicle 14 having a collapsible vehicular armrest substrate 16 that includes load-bearing strips 18 extending across a gap 20 defined within a support frame 22 of the vehicle armrest 10. A first tunable element 24 is configured to secure the load-bearing strips 18 in a support position 26 on the support frame 22. A first tension-adjusting portion 28 of the first tunable element 24 sets a predetermined first tension limit 30 of the first tunable element 24. The load-bearing strips 18 are configured to disengage from the support position 26 when the first tunable element 24 experiences an actual tension 32 greater than the predetermined first tension limit 30. The collapsible vehicular armrest substrate 16 also includes a plurality of tying elements 34, wherein each of the tying elements 34 extends between adjacent load-bearing strips 18.

Referring again to FIGS. 2-5, the first tunable element 24 of the collapsible vehicular armrest substrate 16 is disposed proximate an inboard member 50 of the support frame 22.

The first tension-adjusting portion 28 can be positioned at an end 52 of the first tunable element 24 and is coupled to a first end member 54 of the support frame 22. In the various embodiments, the collapsible vehicular armrest substrate 16 can also include a second tunable element 56 that is configured to further secure the load-bearing strips 18 to the support frame 22 and in the support position 26. In such an embodiment, the second tunable element 56 includes a second tension-adjusting portion 58 that sets a predetermined second tension limit 60 of the second tunable element 56. The load-bearing strips 18 are configured to disengage from the support position 26 when the second tunable element 56 experiences an actual tension 32 that is greater than the predetermined second tension limit 60. It is contemplated that the second tunable element 56, in various embodiments, is positioned proximate an outboard member 62 of the support frame 22. The second tension-adjusting portion 58 can be positioned at an end 68 of the second tunable element 56 and can be coupled to at least one of the first end member 54 and a second end member 64 of the support frame 22. It is contemplated that based upon the design of the collapsible vehicular armrest substrate 10, the actual tension 32 placed upon the first tunable element 24 may be different than the actual tension 32 experienced by the second tunable element 56 in a particular collision. Also, it is contemplated that the amount of actual tension 32 necessary to meet or exceed the respective predetermined first and second tension limits 30, 60 may also be different.

Referring again to FIGS. 2-6, the collapsible vehicular armrest substrate 16 is configured to be selectively tunable such that each of the first and second tunable elements 24, 56 can be individually tensioned during manufacture of the armrest substrate 16 in order to provide a predetermined amount of support and structural integrity to the vehicle armrest 10. In this manner, the first and second tension-adjusting portions 28, 58 can be manipulated to increase or decrease the tension placed upon the respective first and second tunable elements 24, 56 where greater or lesser amounts of tension are desired depending upon the vehicle 14 and the desired application that the collapsible vehicular armrest substrate 16 is to be disposed within.

In various embodiments, it is contemplated that the first and second tunable elements 24, 56 can be selectively tensioned during manufacture such that the first and second tunable elements 24, 56 can be set to respective predetermined first and second tension limits 30, 60 that are within various predetermined tolerances determined during the design of the vehicle 14. Accordingly, a single collapsible vehicular armrest substrate 16 can be used for various models of vehicles 14, where different tensioning parameters may be required for the armrest substrate 16, depending upon the vehicle 14 into which the armrest substrate 16 is disposed. In various embodiments, it is contemplated that the first and second tension-adjusting portions 28, 58 can be modified after manufacture to adjust the tension of the first and second tunable elements 24, 56 to provide varying degrees of structural integrity, where desired, during use of the vehicle 14.

Referring again to FIGS. 2-5, the first tension-adjusting portion 28 is configured to modify the predetermined first tension limit 30 of the first tunable element 24 between a first and second tension, the first tension being different than the second tension. Similarly, the second tension-adjusting portion 58 is configured to modify the predetermined second tension limit 60 of the second tunable element 56 between a third and fourth tension, where the third tension is different than the fourth tension. In the various embodiments, it is contemplated that the first and second tension-adjusting portions 28, 58 can include various mechanisms that are configured to adjust the tension of the first and second tunable elements 24, 56, respectively. Such tensioning mechanisms can include, but are not limited to, tensioning bolts, ratcheting mechanisms, levers, dials, springs, screw-type mechanisms, turnbuckles, and other similar tensioning mechanisms. In various alternate embodiments, it is contemplated that the first and second tension-adjusting portions 28, 58 can be coupled to various motorized or other powered mechanisms for increasing or decreasing the tension upon the first and second tunable elements 24, 56, respectively. Such motorized or powered mechanisms can include, but are not limited to, motors, hydraulics, pneumatic mechanisms, or other similar motorized or powered tensioning mechanisms. It is contemplated that the tensioning of the first and second tunable elements 24, 56 can be adjusted, during use, based upon particular driving conditions, or specifically selected driving modes.

Referring again to FIGS. 4 and 5, it is contemplated that the first and second tunable elements 24, 56 are configured to be passed through conduits 66 disposed through each of the load-bearing strips 18. As each of the first and second tunable elements 24, 56 are set to the respective first and second tension limits 30, 60 by the first and second tension-adjusting portions 28, 58, the first and second tunable elements 24, 56 are allowed to move, or slide through the conduits 66 of the load-bearing strips 18 without substantially moving the load-bearing strips 18. It is contemplated that in alternate embodiments, the first and second tunable elements 24, 56 can be held in a substantially fixed position relative to the load-bearing strips 18. In such an embodiment, as the first and/or second tension-adjusting portions 28, 58 are manipulated, the placement of the load-bearing strips 18 can also be modified. Put another way, as the first and second tunable elements 24, 56 are stretched or relaxed, as the first and/or second tension-adjusting portions 28, 58 are manipulated, the positions of the load-bearing strips 18 relative to the other load-bearing strips 18 can also stretch or relax.

In the various embodiments, when the armrests 10 for various vehicles 14 are designed, the predetermined tension for that particular application can be determined according to various parameters that can include, but are not limited to, vehicle frame strength, type of vehicle, impact testing, airbag positioning, airbag deployment force, and other various factors that may impact the design and structural properties required of the vehicle armrest 10. Once the required tension for the collapsible vehicular armrest substrate 16 is determined for the particular vehicle 14, the first and second tension-adjusting portions 28, 58 can be tuned to properly adjust the tension of the first and second tunable elements 24, 56, respectively, in order to modify the collapsible vehicular armrest substrate 16 to match the respective predetermined first and second tension limits 30, 60 that are substantially similar to the designed tension parameters for the particular vehicle armrest 10 of the vehicle 14.

Figure 4:
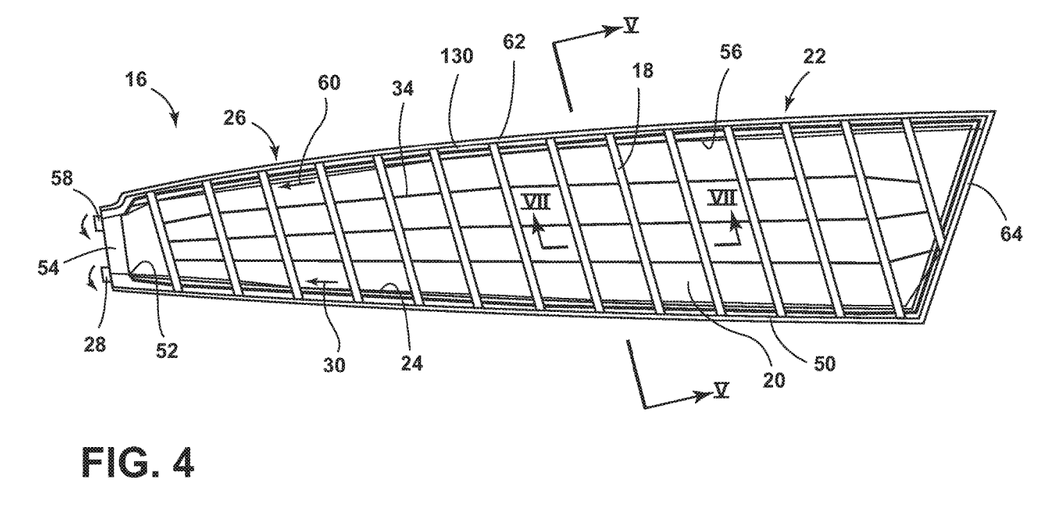
FIG. 4 is a top plan view of an alternate embodiment of the tunable armrest substrate.
Figure 5:
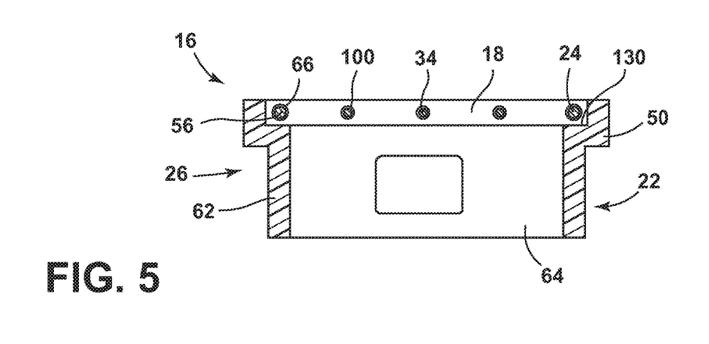
FIG. 5 is a cross section view of the tunable armrest substrate of FIG. 4 taken along line V-V.
Figure 6:
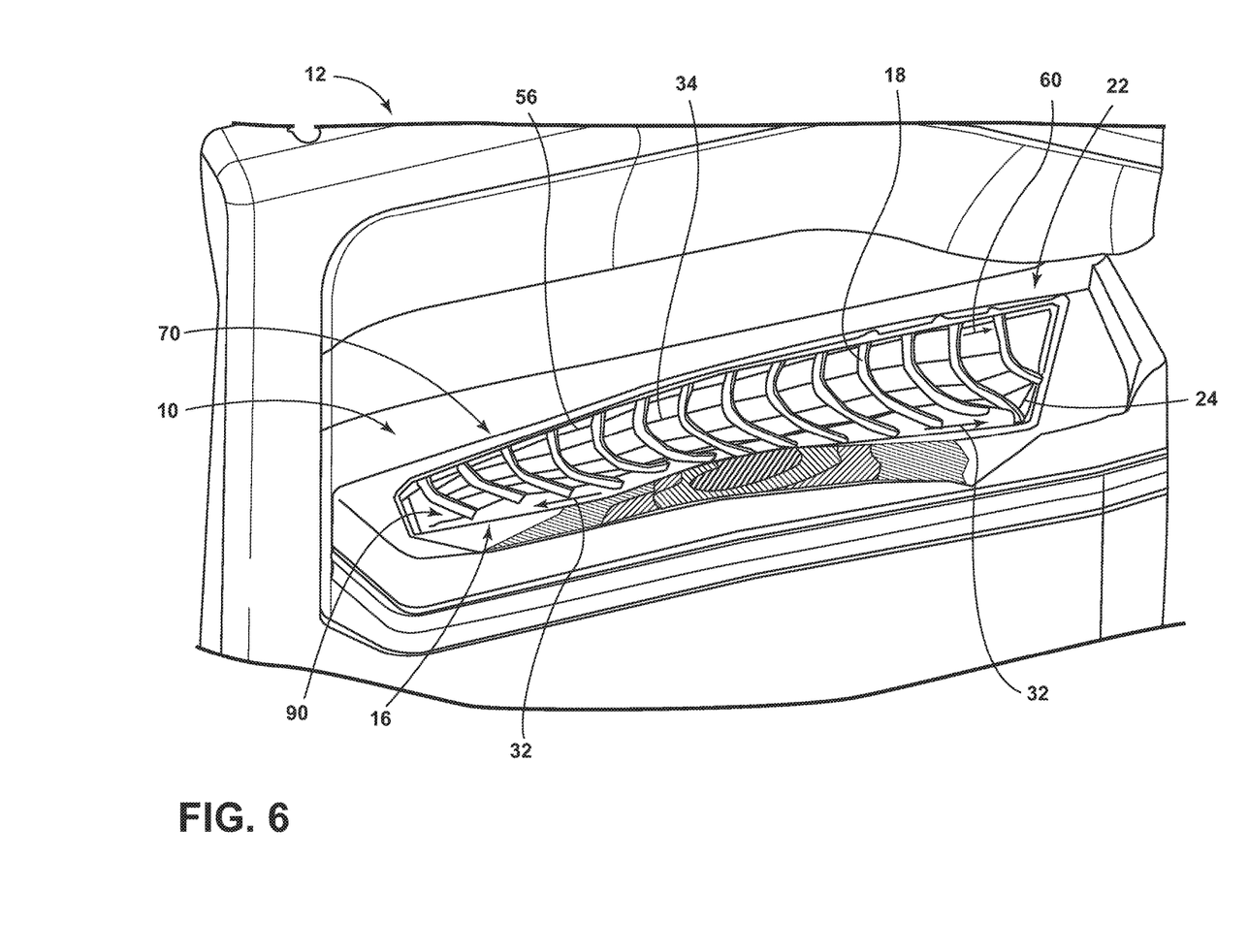
FIG. 6 is a top perspective view of another embodiment of the tunable armrest substrate in a collapsed position.

Referring now to FIGS. 4 and 5, the load-bearing strips 18 of the collapsible vehicular armrest substrate 16 can be substantially flexible members. It is contemplated that each of the load-bearing strips 18 is coupled to and extends between the first and second tunable elements 24, 56. In this manner, when the first and second tension-adjusting portions 28, 58 of the respective first and second tunable elements 24, 56 are tuned to the predetermined first and second tension limits 30, 60, the first and second tunable elements 24, 56 are configured to secure the load-bearing strips 18 in the support position 26. When the substantially flexible load-bearing strips 18 are in the support position 26, the load-bearing strips 18 are held in a substantially straight position due to the tension of the first and second tunable elements 24, 56. It is also contemplated that the load bearing strips 18 can be made of substantially rigid members, in various embodiments.

It is contemplated that the load-bearing strips 18 are afforded a limited amount of movement when in the support position 26. In the various embodiments, where less tension is exerted upon the first and second tunable elements 24, 56, the load-bearing strips 18 are configured to deflect a greater distance within a support position 26 than where the first and second tunable elements 24, 56 include a higher tension. Generally, the lesser tension results in a greater predetermined tension limit, where greater force is required to disengage the load-bearing strips 18 from the support position 26. Conversely, where the first and second tunable elements 24, 56 have a greater tension exerted upon them by the first and second tension-adjusting portions 28, 58, a lesser impact is necessary to cause a failure of at least a portion of the first and/or second tunable elements 24, 56 such that the load-bearing strips 18 are disengaged from the support position 26 within the support frame 22. Such a configuration can be incorporated in situations where a door 12 or side panel airbag or the steering wheel airbag is positioned proximate the armrest 10. By way of explanation, and not limitation, when an airbag deploys, it can at least partially engage the armrest 10 containing the collapsible vehicular armrest substrate 16. In these embodiments, in order to allow the airbag to fully deploy, the force of the airbag engaging the armrest 10 containing the collapsible vehicular armrest substrate 16 causes the first or second tunable elements 24, 56, or both, to experience the actual tension 32 that can be greater than one or more of the predetermined first and second tension limits 30, 60 to which the respective first and second tunable elements 24, 56 were tuned to during manufacture. In turn, the deployment of one or more airbags can cause the collapsible vehicular armrest substrate 16 to be deformed into a collapsed position 70 wherein the load-bearing strips 18 are disengaged from the support frame 22 and at least a portion of the first or second tunable elements 24, 56, or both, are caused to fail by stretching, breaking, severing, or other manner. Accordingly, the collapsed position 70 of the collapsible armrest substrate 16 is at least partially defined by at least one of the first and second tunable elements 24, 56 being in a minimally tensioned state 90, where little to no tension is placed on one or both of the first and second tunable elements 24, 56.

Referring again to FIG. 6, it is contemplated that the vehicle armrest 10 containing a collapsible vehicular armrest substrate 16 can also be placed into the collapsed position 70 during an impact situation, such as a front, side or other impact, where the outer surface of the armrest 10 is forced inward into the passenger cabin of the vehicle 14. In such a situation, the outer surface of the vehicle armrest 10 can at least partially engage a vehicle seat or an occupant of the vehicle seat. Under such conditions, the force of the vehicle armrest 10 colliding with the vehicle seat or the occupant of the vehicle seat can cause at least one of the first and second tunable elements 24, 56 to experience the actual tension 32 that is greater than the predetermined first and second tension limits 30, 60 such that the at least one of the first and second tunable elements 24, 56 of the collapsible vehicular armrest substrate 16 are caused to fail and be placed in the minimally tensioned state 90. As discussed above, when either of the first and second tunable elements 24, 56, or both, are placed into the minimally tensioned state 90, the load-bearing strips 18 are substantially released from the support position 26 and are moved into the collapsed position 70 wherein the load-bearing strips 18 are substantially disengaged from the support frame 22.

Referring again to FIGS. 3-5, when the load-bearing strips 18 are in the support position 26, the load-bearing strips 18, in combination with the first and second tunable elements 24, 56, are configured to provide lateral support to the support frame 22. So long as the forces exerted upon the armrest 10, from the side above, or below, do not cause the first or second tunable elements 24, 56 to experience an actual tension 32 above the respective predetermined first and second tension limits 30, 60, the load-bearing strips 18 can continue to at least partially support the support frame 22.

Referring again to FIG. 6, in various embodiments, the load-bearing strips 18 can be substantially flexible members that are held in a substantially linear configuration in the support position 26 by the first and second tunable elements 24, 56. When the tunable elements are placed in the minimally tensioned state 90, the substantially flexible load-bearing strips 18 are allowed to bend and flex within the support frame 22 to allow the armrest 10 to collapse with minimal interference from the collapsible vehicular armrest substrate 16. In the various embodiments, where the load-bearing strips are substantially rigid members, when the first and second tunable elements 24, 56 are placed in the minimally tensioned state 90, the load-bearing strips 18 are allowed to rotate within the support frame 22 to allow the armrest 10 to collapse with minimal interference from the collapsible vehicular armrest substrate.

Referring again to FIGS. 2-6, in various embodiments, the load-bearing strips 18 are substantially parallel with one another and each of the plurality of tying elements 34 that extend between the load-bearing strips 18 are oriented substantially perpendicular to the load-bearing strips 18 when the load-bearing strips 18 are in the support position 26. In this manner, the load-bearing strips 18 and the tying elements 34 form a collapsible grid that is positioned within a perimetrical frame defined by the inboard and outboard members 50, 62 and first and second end members 54, 64 of the support frame 22 of the collapsible vehicular armrest substrate 16. In such an embodiment, the first and second tunable elements 24, 56 are extended through each of the load-bearing strips 18 in order to place the load-bearing strips 18 within the support position 26 within the support frame 22. It is also contemplated that in various embodiments that the load-bearing strips 18 and/or the tying elements 34 can be configured to be non-parallel. It is contemplated that in various embodiments, the plurality of tying elements 34 and the plurality of load-bearing strips 18 are integrally formed from a single piece or, in various embodiments, can be assembled as a unit of separately formed components. Other configurations are possible so long as the load-bearing strips 18 are substantially unimpeded by the configuration from moving to the collapsed position 70. In the various embodiments, the tying elements 34 can engage a top surface, bottom surface or other surface of one or more of the load-bearing strips 18. It is also contemplated that the tying elements 34 can pass through one or more of the load-bearing strips 18.

Figure 7:
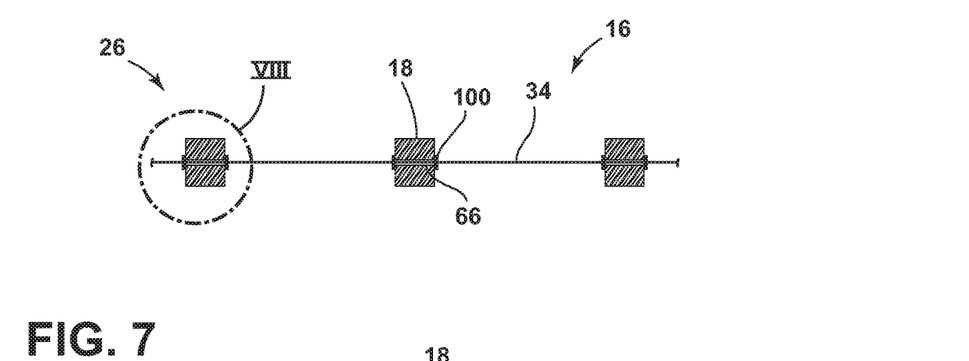
FIG. 7 is a cross-sectional view of the tunable armrest substrate of FIG. 4 taken along line VII-VII.
Figure 8:
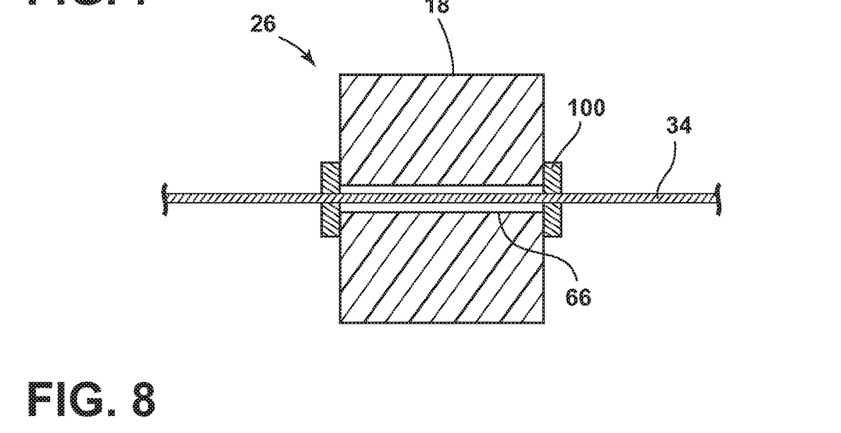
FIG. 8 is a detail cross-sectional view of the tunable armrest substrate of FIG. 7 taken at area VIII.

Referring now to FIGS. 7 and 8, in various embodiments, the plurality of tying elements 34 can be made up of individual members that extend from one side of the collapsible armrest substrate 16 to the other. In such an embodiment, each tying element engages a plurality of the load-bearing strips 18. At each load-bearing strip 18, each tying element can include one or more retaining features 100 that maintain the position of the load-bearing strips 18 relative to each tying element. In this manner, when one of the load-bearing strips 18 move toward the collapsed position 70, the engagement of each tying strip with a plurality of load-bearing strips 18, causes all of the load-bearing strips 18 to move to the collapsed position 70. The load-bearing strips 18 and the tying elements 34, in this regard, form a substantially unified structure where the movement of one load-bearing strip 18 causes the movement of all of the load-bearing strips 18 to the collapsed position 70. In the various embodiments, the tying elements 34 can extend through conduits 66 defined within the load-bearing strips 18.

Figure 9:
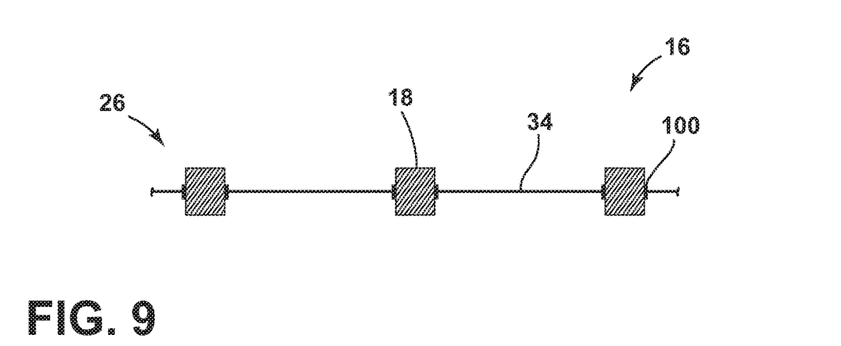
FIG. 9 is a cross-sectional view of an alternate embodiment of the tunable armrest substrate of FIG. 7.

Referring now to FIG. 9, it is contemplated that, in various embodiments, the tying elements 34 can be shorter individual members that extend between adjacent load-bearing strips 18. In this manner, the tying elements 34 are attached to the load-bearing strips 18 but do not pass through or across the load-bearing strips 18. The result of this connection between the load-bearing strips 18 and the tying elements 34 is substantially similar to that described above. The movement of one load-bearing strip 18 toward the collapsed position 70 causes the collapse of all load-bearing strips 18 as the load-bearing strips 18 and the tying elements 34 form a unified structure.

In the various embodiments, it is contemplated that the first and second tunable elements 24, 56 can extend through the load-bearing strips 18. The first and second tunable elements 24, 56 can extend through the load-bearing strips 18 at the top, bottom, middle or any other elevation along the load-bearing strips 18. It is also contemplated that the first and second tunable elements 24, 56 can engage the load-bearing strips 18 along a top or bottom surface of the load-bearing strips 18 or at another elevation along the height of the load-bearing strips 18.

Referring again to FIGS. 4-6, in various embodiments, during the manufacture of the collapsible vehicular armrest substrate 16, the tying elements 34 are coupled with each of the load-bearing strips 18. It is contemplated that the tying elements 34 can be threaded through a central portion of each of the load-bearing strips 18 or can be attached to a surface of each of the load-bearing strips 18. It is further contemplated that each of the tying elements 34 can include one or more retaining features 100 disposed along the length of each of the tying elements 34. In such an embodiment, each of the retaining features 100 is configured to position the plurality of load-bearing strips 18 at a predetermined distance relative to the other load-bearing strips 18. In this manner, when the first and second tunable elements 24, 56 are placed within the minimally-tensioned state, the movement of one of the load-bearing strips 18 causes movement in each of the tying elements 34 that are engaged to the load-bearing strip 18 at the retaining features 100 of the tying elements 34. Through this engagement between the load-bearing strips 18 and the tying elements 34, the movement of one of the load-bearing strips 18 causes all of the load-bearing strips 18 to move into the collapsed position 70. It is contemplated that in the various embodiments, the movement of any one of the load-bearing strips 18 caused by an external force, such as an airbag deployment, lateral impact force, or other lateral or external force, will result in each of the load-bearing strips 18 being moved to the collapsed position 70 of the collapsible vehicular armrest substrate 16.

In the various embodiments, it is contemplated that the collapsible vehicular armrest substrate 16 can be installed within armrests 10 of vehicle doors 12 within the vehicle 14 adjacent to any particular vehicle seat. Additionally, the collapsible vehicular armrest substrate 16 can be placed within armrests 10 for body panels that are adjacent to vehicle seating with no adjacent door 12. Such locations can include the rear seat of a coupe or third row seating within SUVs, CUVs, and other vehicles 14 that include third row seating.

Referring again to FIGS. 1-8, in the various embodiments, the support frame 22 of the collapsible vehicular armrest substrate 16 can be made of various substantially rigid materials that can include, but are not limited to, metals, metal alloys, plastic, composite, polymers, combinations thereof, and other substantially rigid materials that are configured to substantially retain each of the load-bearing strips 18 in the support position 26 within the support frame 22. Additionally, the support frame 22 can be configured to collapse under a substantially minimal force over the load-bearing strips 18 once the load-bearing strips 18 are moved to the collapsed position 70. As such, the support frame 22 can include weakened portions to allow for such collapsing. It is also contemplated that the load-bearing strips 18 of the armrest substrate 16 can be made of a material that is at least partially flexible but can also be retained by the tying elements 34 and the first and second tunable elements 24, 56 in the support position 26 to receive general stresses that are experienced under normal use of the vehicle armrest 10. It is contemplated that the flexible character of each of the load-bearing strips 18 can be used to provide a cushioning functionality to the vehicle armrest 10. In this manner, typical vertical loads experienced by the armrest substrate 16 under everyday use such as supporting the arm of an occupant, supporting the use of a handle 120 to enter or exit the vehicle 14 or to open or close the vehicle door 12, and other similar and typical stresses experienced by the vehicle armrest 10 under general use. In such embodiments, the first and second tunable elements 24, 56 can be tuned such that these typical stresses will not cause the first and second tunable elements 24, 56 to experience failure such that these general stresses do not place the first and second tunable elements 24, 56 near the levels of the predetermined tension limits of the first and second tunable elements 24, 56.

Referring again to FIGS. 3-5, in the various embodiments, the load-bearing strips 18 can be adapted to rest upon seating surfaces 130 of the support frame 22. These seating surfaces 130 can be defined within any one or more of the inboard, outboard, first end or second end members 54, 64 of the support frame 22. It is contemplated that while the seating surfaces 130 vertically support the load-bearing strips 18, the seating surfaces 130 are configured to be substantially free of lateral supporting structures or other retention forms that may retain the load-bearing strips 18 within the support position 26. In this manner, the seating surfaces 130 do not substantially limit the movement of the load-bearing strips 18 toward the collapsed position 70.

In various embodiments, each of the tying elements 34 can be made of a substantially flexible material that when coupled to the plurality of load-bearing strips 18 will allow the load-bearing strips 18 to move to the collapsed position 70, under the appropriate circumstances. The materials of the tying elements 34 can include, but are not limited to, nylon, metal, plastic, polymer, thread and other substantially flexible materials.

Figure 10:
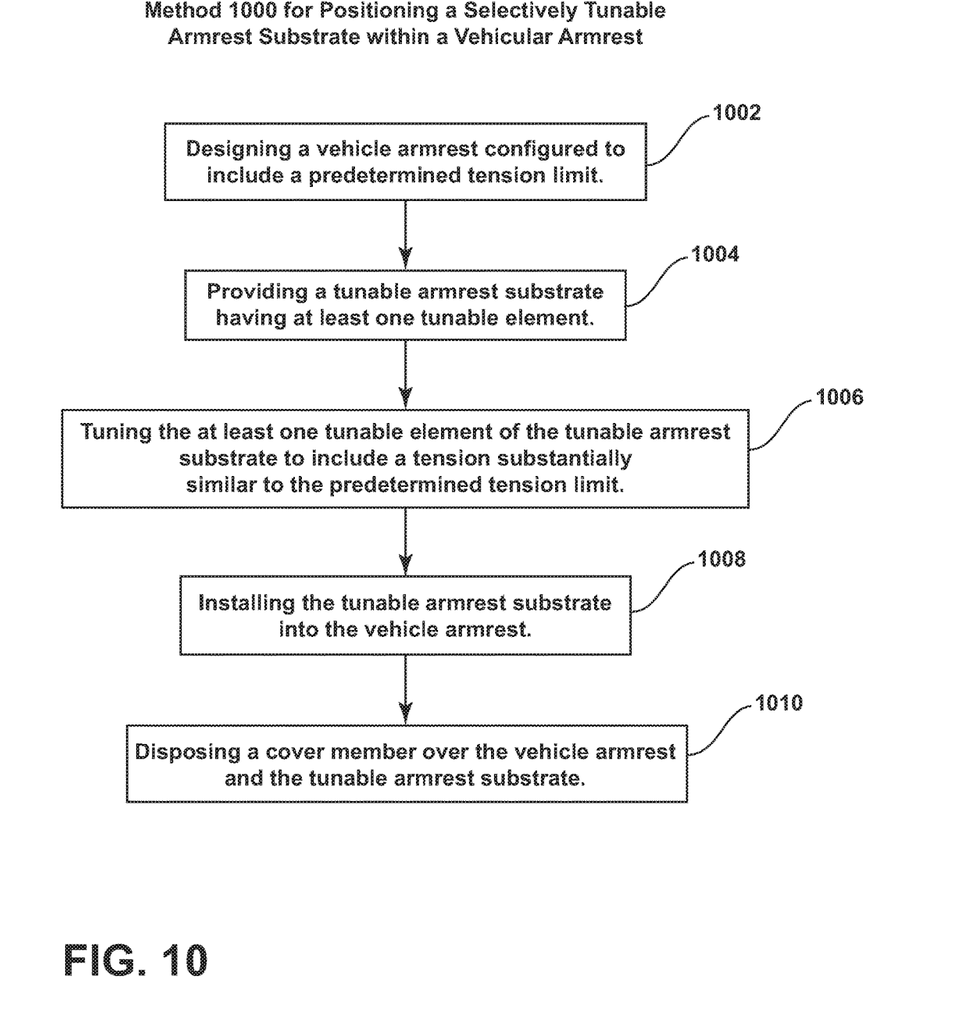
FIG. 10 is a schematic flow diagram illustrating a method for positioning a selectively tunable vehicular armrest within a vehicle door.

Referring now to FIG. 10, having described the various embodiments of the structure of the collapsible vehicular armrest substrate 16, a method 1000 is disclosed for positioning a selectively tunable armrest substrate 16 within the vehicular armrest 10 of a particular vehicle 14. According to a first step of the method 1000, a vehicle armrest 10 is designed for a particular vehicle 14, wherein predetermined first and second tension limits 30, 60 are determined for the vehicular armrest 10 based upon various design and testing parameters (step 1002). As discussed above, the predetermined first and second tension limits 30, 60 can be determined based upon vehicle impact and collision testing, airbag testing, airbag positioning and location, seating configurations, and other various parameters that may affect the structural requirements of the vehicular armrest 10. After testing is completed, a collapsible vehicular armrest substrate 16 is provided for insertion into the designed vehicle armrest 10 (step 1004). In the various embodiments, the collapsible vehicular armrest substrate 16 can include a plurality of collapsible load-bearing strips 18, at least one tunable element that is configured to secure the collapsing load-bearing strips 18 to a perimetrical support frame 22 and in a support position 26 within a support frame 22. The armrest substrate 16 also includes at least one tension-adjustable portion that is configured to set tunable elements of the armrest substrate 16 to the predetermined tension limit determined during design and testing of the vehicle 14. The tension adjustable portion of each of the tunable elements is configured to disengage the collapsible load-bearing strips 18 from the support position 26 within the support frame 22 when the tunable elements within the armrest substrate 16 experience an actual tension 32, due to external forces, that is greater than the predetermined tension limit. Typically, when the tunable elements are placed under a lesser tension, the predetermined tension limit is higher due to each of the tunable elements being placed under less tension, such that a greater force is required to cause one or more of the tunable elements to fail and place the tunable elements within the minimally tensioned state 90. Conversely, when the tunable elements are placed under a higher tension, the predetermined tension limit is lower since a lesser force would be needed, due to the highly tensioned tunable elements, to cause a tunable element to fail.

As discussed above, a single collapsible vehicular armrest substrate 16 can be manufactured for a plurality of vehicles 14. In such embodiments, the first and second tension-adjusting portions 28, 58 of the first and second tunable elements 24, 56 can be adjusted to meet the various design parameters of any number of vehicles 14 into which the armrest substrate 16 can be installed (step 1006). Such configuration can serve to eliminate the need to manufacture specifically designed armrest substrates 16 for each style of vehicle 14 to be manufactured. Once properly tuned, the tunable armrest substrate 16 is disposed within the vehicle armrest 10 of the designed vehicle 14 (step 1008).

According to the method 1000, after the collapsible vehicular armrest substrate 16 is installed within the vehicle armrest 10, a cover member 110 (shown in FIGS. 1-3) is extended over the vehicle armrest 10 and the armrest substrate 16 (step 1010). In various embodiments, various cushioning members can be installed between the armrest substrate 16 and the cover member 110 to provide additional cushioning and comfort to the user of the particular vehicle armrest 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A collapsible vehicular armrest substrate comprising:
a collapsible grid;
a tunable element extending perpendicularly through the collapsible grid for positioning and securing the collapsible grid to a perimetrical frame in a support position; and
a tension-adjusting mechanism that is threadably adjusted to set a predetermined tension limit of the tunable element, wherein the collapsible grid disengages from the support position when the tunable element experiences an actual tension greater than the predetermined tension limit.

2. The armrest substrate of claim 1, wherein the collapsible grid includes a plurality of load-bearing strips and a plurality of tying elements, wherein the plurality of load-bearing strips are substantially perpendicular to the plurality of tying elements, and wherein each tying element extends continuously across the load-bearing strips and engages each load-bearing strip, wherein the tying elements at least partially position the plurality of load-bearing strips relative to the perimetrical frame.

3. The armrest substrate of claim 2, wherein the tunable element includes a first tunable portion disposed proximate an inboard member of the perimetrical frame and a second tunable portion disposed proximate an outboard member of the perimetrical frame.

4. The armrest substrate of claim 3, wherein the tension-adjusting mechanism includes a first tension-adjusting mechanism coupled to the first tunable portion, the first tension-adjusting mechanism is adapted to set a predetermined first tension limit of the first tunable portion, wherein the tension-adjusting mechanism includes a second tension-adjusting mechanism coupled to the second tunable portion, the second tension-adjusting mechanism is adapted to set a predetermined second tension limit of the second tunable portion, and wherein the collapsible grid disengages from the support position when at least one of the first and second tunable portions experience an actual tension that is greater than the respective predetermined first or second tension limit.

5. The armrest substrate of claim 4, wherein the first tension-adjusting mechanism modifies the predetermined first tension limit between a first and second tension, the first tension being different than the second tension, and wherein the second tension-adjusting mechanism modifies the predetermined second tension limit between a third and fourth tension, the third tension being different than the fourth tension.

6. The armrest substrate of claim 5, wherein the load-bearing strips are flexible strips coupled to and extending between the first and second tunable elements.

7. The armrest substrate of claim 6, wherein the tying elements and the load-bearing strips are integrally formed from a single piece.

8. The armrest substrate of claim 1, wherein the tension-adjusting mechanism is a threaded fastener that is rotationally adjusted to set the predetermined tension limit.

9. The armrest substrate of claim 6, wherein the tying elements extend through at least a portion of the load-bearing strips.

10. The armrest substrate of claim 6, wherein each tying element of the plurality of tying elements extends between two adjacent load-bearing strips.

11. A collapsible vehicular armrest substrate comprising:
collapsible load-bearing strips;
at least one tunable element positioning and securing the collapsible load-bearing strips to a perimetrical frame in a support position substantially perpendicular to the at least one tunable element; and
a tension-adjusting portion that sets a predetermined tension limit of the at least one tunable element, wherein the collapsible load-bearing strips move toward a collapsed position disengaged from the perimetrical frame when the at least one tunable element experiences an actual tension greater than the predetermined tension limit, wherein the collapsed position is defined by at least a portion of the collapsible load-bearing strips being substantially parallel with the at least one tunable element.

12. The armrest substrate of claim 11, further comprising:
a plurality of tying elements, wherein each of the plurality of tying elements extends between adjacent collapsible load-bearing strips.

13. The armrest substrate of claim 12, wherein the at least one tunable element includes a first tunable element disposed proximate an inboard member of the perimetrical frame and a second tunable element disposed proximate an outboard member of the perimetrical frame, wherein the collapsible load-bearing strips are slidably engaged with at least one of the inboard and outboard members.

14. The armrest substrate of claim 13, wherein the tension-adjusting portion includes a first tension-adjusting member coupled to the first tunable element, the first tension-adjusting member is adapted to set a predetermined first tension limit of the first tunable element, wherein the tension-adjusting portion includes a second tension-adjusting member coupled to the second tunable element, the second tension-adjusting member is adapted to set a predetermined second tension limit of the second tunable element, and wherein the collapsible load-bearing strips disengage from the support position and move toward the collapsed position when at least one of the first and second tunable elements experience an actual tension that is greater than the respective predetermined first and second tension limits.

15. The armrest substrate of claim 13, wherein the collapsible load-bearing strips are flexible strips coupled to and extending between the first and second tunable elements.

16. The armrest substrate of claim 12, wherein the plurality of tying elements and the collapsible load-bearing strips are integrally formed from a single piece.

17. The armrest substrate of claim 11, wherein the tension-adjusting portion includes a threaded screw that is rotationally adjusted to set the predetermined tension limit.

18. The armrest substrate of claim 12, wherein the plurality of tying elements extend through at least a portion of the collapsible load-bearing strips.

* * * * *